United States Patent
Halbert et al.

(10) Patent No.: US 6,493,250 B2
(45) Date of Patent: Dec. 10, 2002

(54) MULTI-TIER POINT-TO-POINT BUFFERED MEMORY INTERFACE

(75) Inventors: John B. Halbert, Beaverton, OR (US); James M. Dodd, Shingle Springs; Chung Lam, Redwood City, both of CA (US); Randy M. Bonella, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/753,024

(22) Filed: Dec. 28, 2000

(65) Prior Publication Data

US 2002/0084458 A1 Jul. 4, 2002

(51) Int. Cl.[7] .................................................. G11C 5/06
(52) U.S. Cl. ............................. 365/63; 365/51; 365/52; 365/230.03
(58) Field of Search ............................. 365/63, 51, 52, 365/230.03

(56) References Cited

U.S. PATENT DOCUMENTS 5,959,923 A * 9/1999 Matteson et al. ...... 365/230.03
6,223,301 B1 * 4/2001 Santeler et al. ................. 714/5
6,256,221 B1 * 7/2001 Holland et al. ................ 365/63
6,147,921 A1 * 11/2001 Novak et al. ............... 365/236

* cited by examiner

Primary Examiner—Huan Hoang
(74) Attorney, Agent, or Firm—Marger Johnson & McCollom, PC

(57) ABSTRACT

Methods and apparatus for a memory system using a branching point-to-point memory bus architecture are disclosed. In one embodiment, a primary memory controller maintains a point-to-point bus connection with one memory module and that memory module maintains a separate point-to-point bus connection with a second module. Data passing between the memory controller and the second memory module passes through a buffer circuit on the first memory module. For data received from the memory controller, the buffer circuit also passes that data up a module bus segment to a first bank of memory devices. That bank of memory devices maintains a second module bus segment with a second bank of memory devices. Data passing between the buffer circuit and the second bank of memory devices passes through a pass-through circuit on the first bank of memory devices. In this manner, a point-to-point memory bus architecture can be maintained even when a memory module contains more than one bank of memory devices.

24 Claims, 8 Drawing Sheets

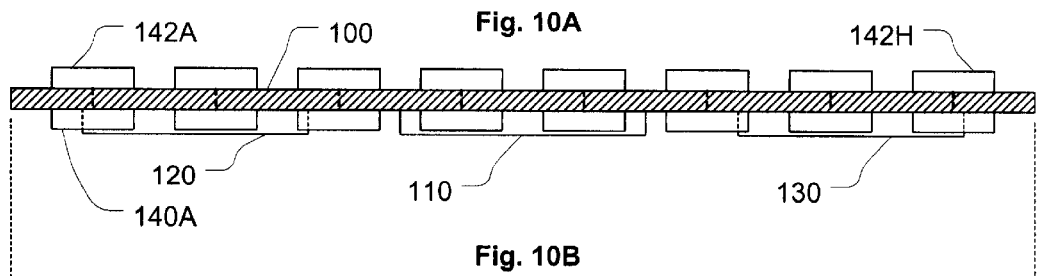
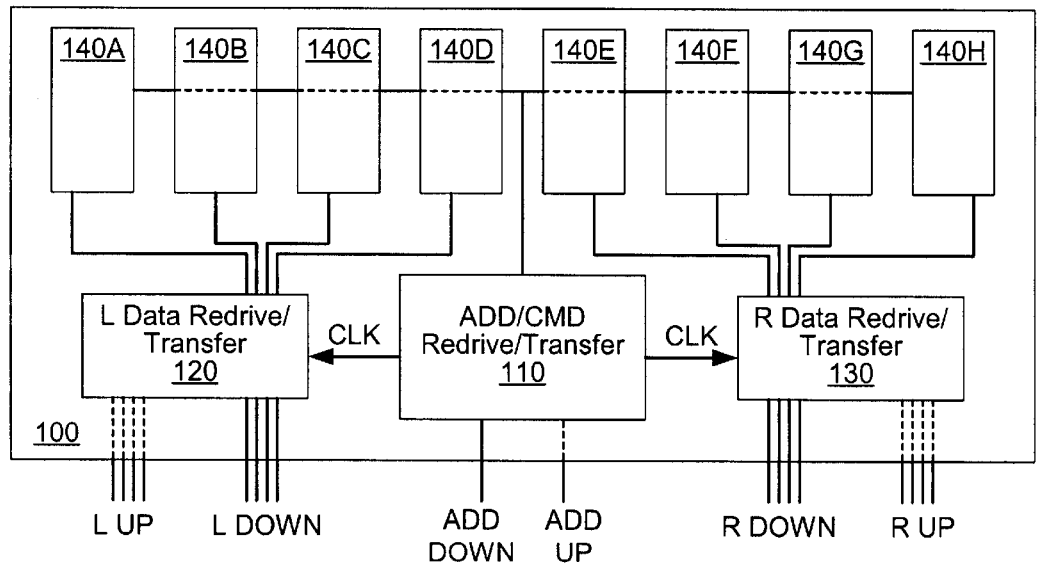

MULTI-TIER POINT-TO-POINT BUFFERED MEMORY INTERFACE

FIELD OF THE INVENTION

This present invention relates generally to digital memory devices and systems, and more particularly to bus architectures and bus communication methods for such devices and systems.

BACKGROUND OF THE INVENTION

Microprocessors, digital signal processors, digital imaging devices, and many other types of digital data processing devices rely on an attached high-speed memory system to hold data and/or processor instructions needed by the processing device. As these processing devices become faster and more powerful, the increased demands placed on them generally translates to a need for larger and faster attached memory systems.

FIG. 1 depicts a typical memory system configuration. One or more memory devices 26AA, 26AB, 26BA, 26BB, 26CA, 26CB interface with a memory controller 20 through a memory bus 22. A host (e.g., a central processing unit (CPU), not shown) also connects to memory controller 20 through a front-side bus FSB. The memory devices hold data in arrays of addressable memory cells. Memory controller 20 controls the exchange of data between the host and the memory storage devices.

Memory bus 22 carries memory signals on a set of signal lines. Memory signals fall generally into one of several categories including clock and control signals, address signals, command signals, and data signals. Data signals carry the actual data that will be stored in, or retrieved from, a memory device. Address signals specify the location within a memory device where data is to be read from or written to, and may also select which of several memory devices is to be accessed. Command signals instruct a memory device as to what type of operation is to be performed, e.g., read, write, refresh, and possibly as to which of several access modes (such as a burst mode) should be used for a data transfer. Clock and control signals synchronize the other signals passing between controller 20 and the memory devices. Although memory bus 22 may use a separate signal line for each memory signal (e.g., 32 address lines to transfer a 32-bit-wide address in one clock cycle and 32 data lines to transfer a 32-bit-wide data word in one clock cycle), various schemes also exist to re-use one or more signal lines for different memory signals during different clock cycles of a memory transaction.

In the configuration shown in FIG. 1, memory bus 22 is a multi-drop memory bus. In other words, bus 22 is arranged with a backbone of signal lines. A signal line stub, or "drop", connects each of the memory devices to the backbone. Typically, memory bus 22 will comprise a collection of leads routed on a printed circuit board 21 known as the "main board" or "motherboard". Memory controller 20 mounts to motherboard 21 and connects to one end of the leads comprising memory bus 22. Each drop of memory bus 22 connects to an electrical terminator, or socket. A typical main board contains multiple memory sockets, e.g., the three sockets 28A, 28B, and 28C shown in FIG. 1.

Memory is added to the memory system by inserting memory modules (e.g., 24A, 24B, 24C) into one or more of the sockets. One popular type of memory module is a Dual In-line Memory Module, or DIMM. The DIMM is a rectangular low-profile circuit board that has electrical contact points arranged on both sides along one long edge. The contact points form electrical connections to the main board's memory bus when the DIMM is inserted into a DIMM memory socket.

A DIMM generally has multiple individual memory devices mounted to it. The devices all work in parallel to perform memory functions. For instance, a DIMM may have eight memory devices, each of which receives the same memory address from the controller. If the size of a data word is 32 bits, each of the memory devices is responsible for four bits of the data word that is placed on the memory bus. The DIMMs depicted in FIG. 1 are dual-bank DIMMs, i.e., an "A" bank and a "B" bank of memory devices reside on the DIMM. The A bank and the B bank occupy logically separate areas of memory space, such that each bank can be addressed separately.

BRIEF DESCRIPTION OF THE DRAWING

The invention may be best understood by reading the disclosure with reference to the drawing, wherein:

FIGS. 10A and 10B show two views of a common-clocked memory module according to an embodiment of the invention;

FIG. 11 shows a side view of a source-synchronous memory module according to an embodiment of the invention.

DETAILED DESCRIPTION OF THE EMBODIMENTS

It is recognized herein that the multi-drop memory bus architecture has several characteristics that limit its expansion to greater numbers of memory devices and/or faster bus speeds. First, the stubbed bus architecture can create undesirable reflections on the signal lines at high frequency. Overall bus length can also cause timing problems that limit operational frequency, as at high frequency a significant skew will be observed between when a memory signal arrives at a closer device vs. when that signal arrives at a device further down the bus. The length of the bus and the number of device inputs also determine the capacitance that a memory device (or the controller) sees when it drives the bus—at higher frequencies, this capacitance may make it infeasible to drive signals reliably on the bus.

Figure 1:
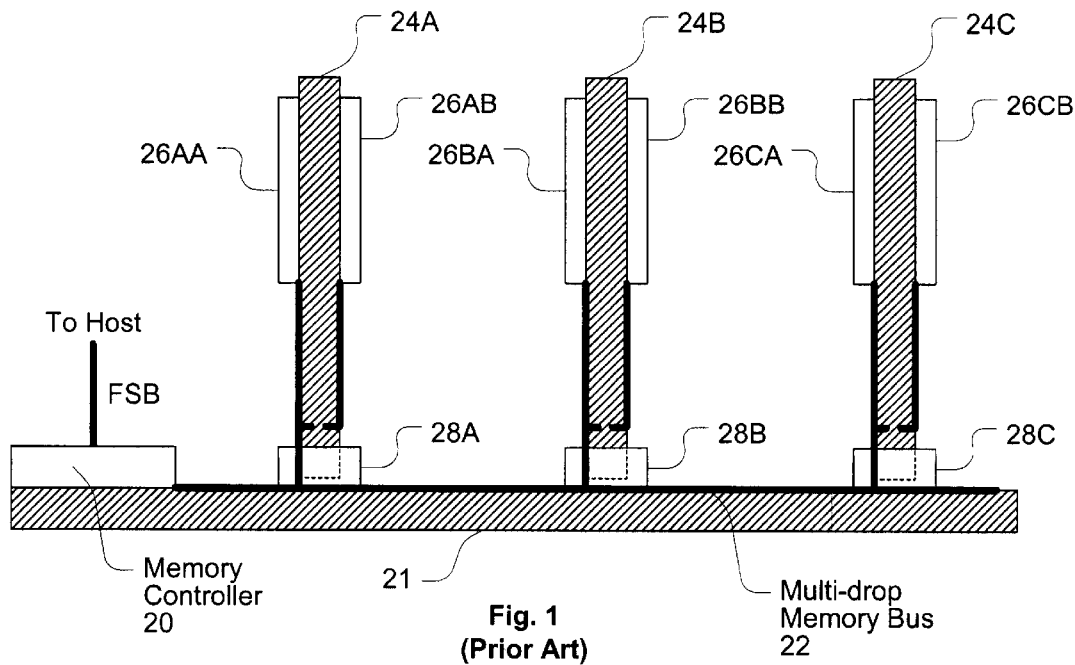
FIG. 1 illustrates a prior art memory system.
Figure 2:
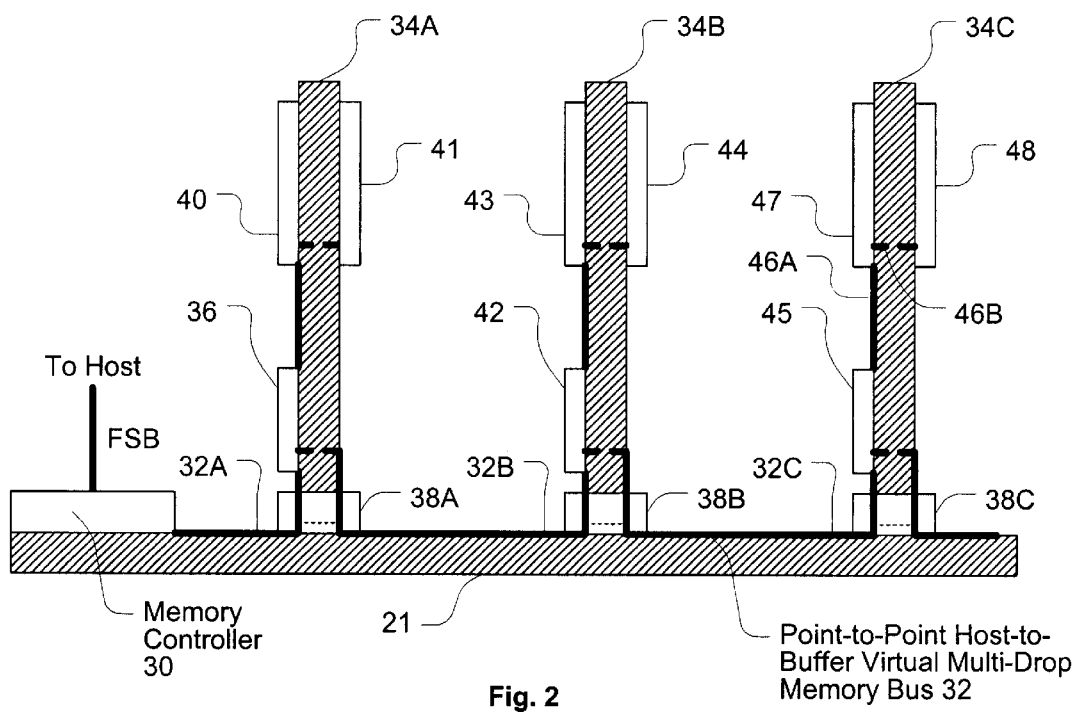
FIG. 2 illustrates a modular memory system using a two-tier point-to-point memory bus architecture according to an embodiment of the invention.

A new memory bus architecture and memory module designs according to the present invention are disclosed. Referring to FIG. 2 as an example, memory bus communications in this architecture pass along point-to-point connections between a memory controller 30 and buffer circuits (e.g., 36). For instance, when memory controller 30 is commanded to send memory signals to device 48 on module 34C, it sends those signals along a first segment 32A of first-tier memory bus 32 to buffer 36 on module 34A. Buffer 36 redrives the memory signals to buffer 42 along a physically separate segment 32B of first-tier memory bus 32. Buffer 42 redrives the signals in turn to buffer 45 along a third physically separate segment 32C of first-tier memory bus 32. Buffer 45 transfers the signals to memory device 47 on segment 46A of a module memory bus. Finally, memory device 47 redrives the signals to memory device 48 on segment 46B of the module memory bus.

The bus architecture of FIG. 2 solves problems of the prior art. The relatively short, point-to-point bus segments greatly simplify impedance matching and bus timing issues. The capacitance seen by a bus driver can also be significantly reduced—on a given segment of bus 32 (or a segment of a module memory bus), only one buffer's input needs to be driven. And each memory device only sees one buffer input on its own module, no matter how many modules exist in the memory system or how many memory devices are connected in point-to-point fashion on the module.

By extending the bus architecture to two tiers, the advantages of the point-to-point bus configuration can be extended to a module memory bus, for an application such as a dual-bank DIMM. This can allow memory density to increase for a given number of memory sockets. Furthermore, the two-tier configuration can result in a shorter average number of point-to-point hops for a given number of memory banks.

Several terms have been assigned particular meanings within the context of this disclosure. A bank of memory devices is a collection of one or more devices that store data for a particular partition of host-addressable memory space. Memory signals propagating towards a destination bank of memory devices propagate upstream; conversely, memory signals propagating towards a memory controller propagate downstream. A splitting node is a bus repeater with one downstream bus path and at least two upstream bus paths—specific implementations of splitting nodes are also referred to herein as buffers or buffer circuitry. A memory terminal node is a memory device bank that receives and transmits on a single downstream bus path. A memory pass-through node is a memory device bank that can receive and transmit for itself on a downstream bus path, and that can also pass data through between the downstream bus path and an upstream bus path.

Figure 3:
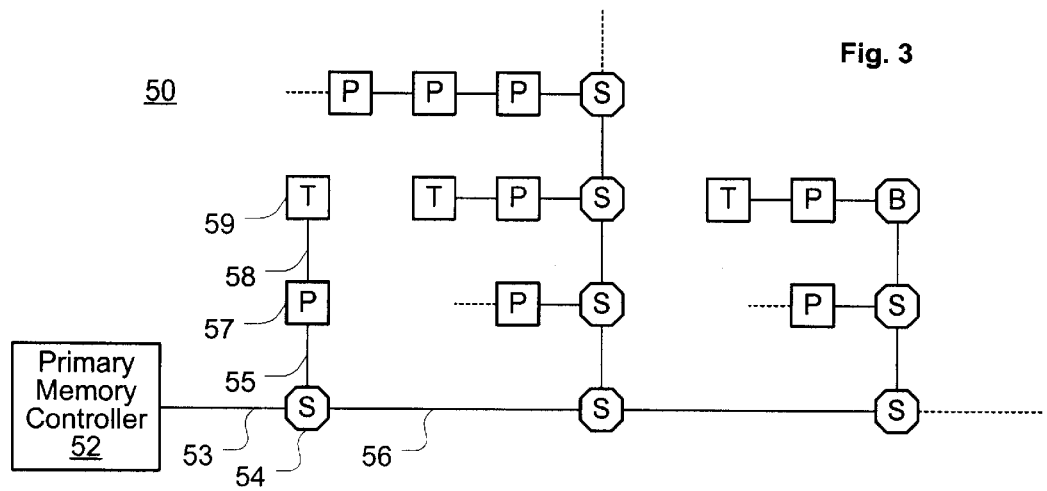
FIG. 3 shows a binary-partitioned address space as it relates to a memory system such as the modular memory system.
Figure 4:
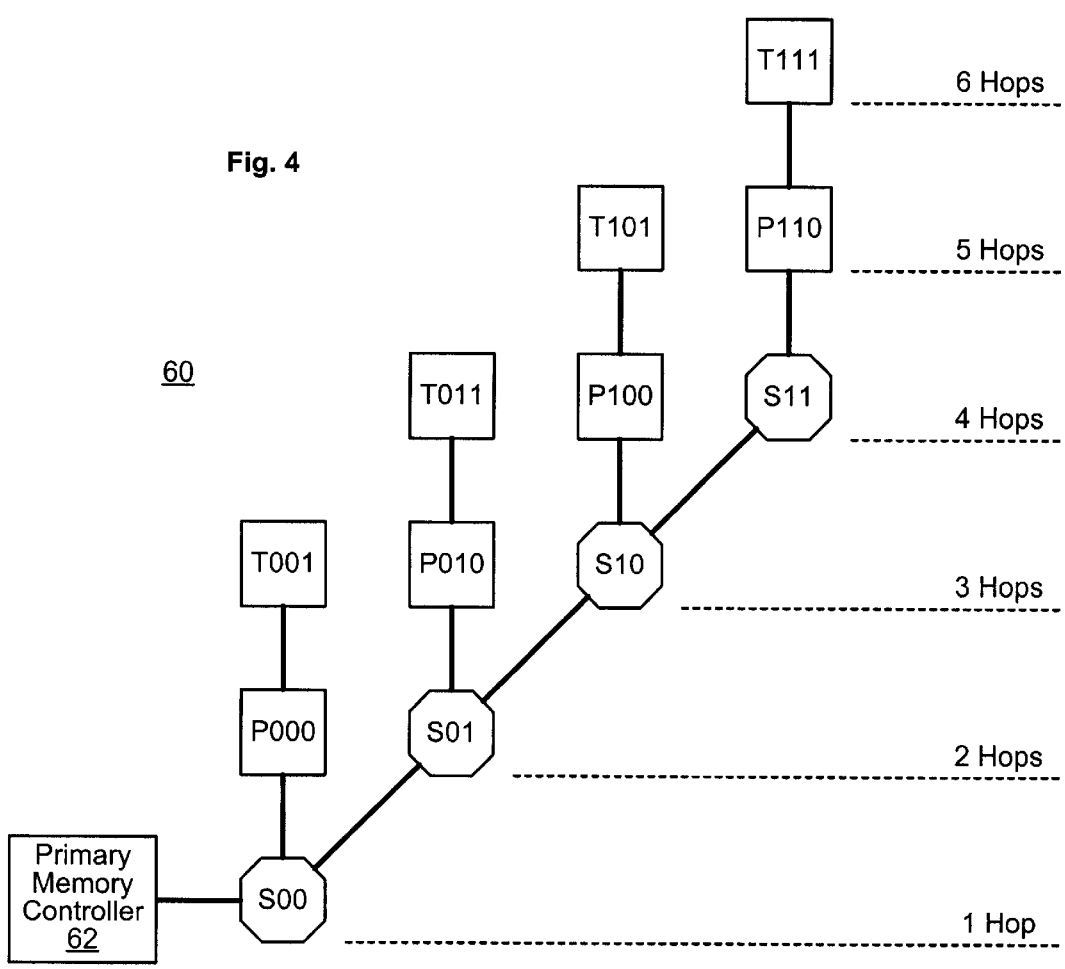
FIG. 4 shows generally how an embodiment of the invention can extend to multiple levels of tiers and buffers, with the possibility of flexible configuration at each branch.

Referring to FIGS. 3 and 4, some general concepts related to the invention will first be introduced. FIG. 3 shows generally how a memory system can be constructed using splitting nodes S, memory pass-through nodes P, and (optionally) memory terminal nodes T. A primary memory controller 52 connects through an upstream port to a first memory bus segment 53 and a first splitting node 54. The splitting node 54 attaches to two upstream memory bus segments 55 and 56. A memory pass-through node 57 attaches to the upstream end of bus segment 55. Memory pass-through node also attaches to a memory terminal node 59 through another bus segment 58. The memory system can be expanded into a wide variety of configurations by attaching additional splitting nodes, memory pass-through nodes, and memory terminal nodes to bus segment 56 (some examples are shown). Splitting nodes and memory pass-through nodes can be designed to function with an unconnected upstream node as well, such that memory terminal nodes are not required.

Referring next to FIG. 4, a more specific implementation is shown. An available memory space is partitioned among four splitting nodes. The splitting nodes are numbered S00, S01, S10, S11, indicating the memory partitions that they serve.

Each splitting node Sx, where x represents one of the memory partitions 00, 01, 10, 11, connects to a memory pass-through node Px0, which connects in turn to a memory terminal node Tx1. Thus memory space x is further partitioned into an x0 space, served by a pass-through node, and an x1 space, served by a terminal node.

The number of point-to-point memory segments required to reach a given memory node from the primary memory controller can be determined in this example from the partition address. The desired splitting node is reached after x+1 bus segment hops, i.e., S00 is reached from primary memory controller 62 after one hop, S01 is reached after two hops, S10 is reached after three hops, and S11 is reached after four hops. One additional hop is required to reach memory pass-through node Px0 from splitting node Sx, and two additional hops are required to reach memory terminal node Tx1 from splitting node Sx. Memory controller 62 can use the address of the desired memory partition to calculate the number of hops required to reach a given memory location.

Figure 5:
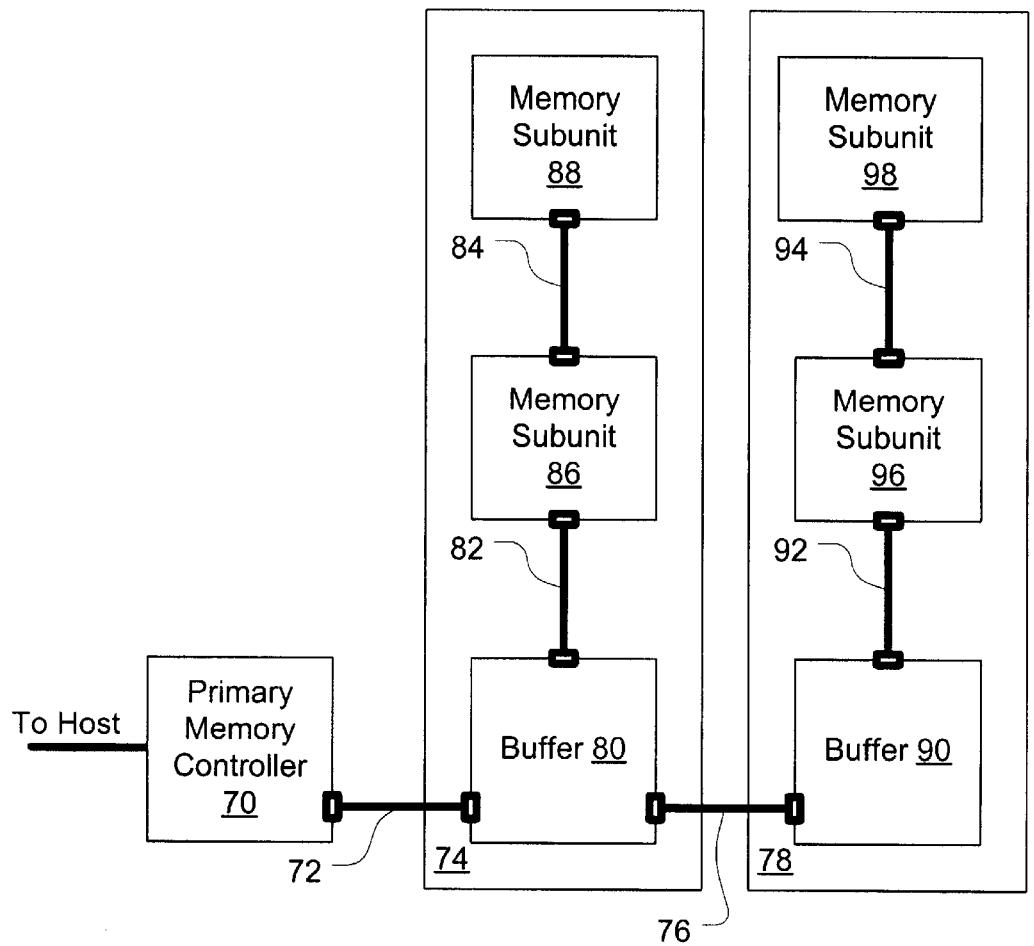
FIG. 5 illustrates an embodiment of the invention that uses memory pass through subunits to terminal memory subunits.

FIG. 5 illustrates a limited memory configuration according to an embodiment of the invention. The memory accessible to primary memory controller 70 is contained in two memory units 74 and 78, which may be, e.g., memory modules. Each memory unit comprises a buffer (which may comprise buffer circuitry distributed in several components), capable of functioning as a splitting node, one memory pass-through subunit, and one memory terminal subunit.

Primary memory controller 70 communicates with the memory subunits via a collection of primary and secondary bus segments. Primary memory controller 70 connects to memory unit 74, and more specifically, to a buffer 80 on memory unit 74, via a first primary memory bus segment 72. Memory units 74 and 78, and more specifically, buffer 80 and buffer 90, connect via a second primary bus segment 76. In this manner, buffer 80 facilitates the transfer of memory signals between memory controller 70 and memory unit 78 by forwarding signals received on one of bus segments 72, 76 to the other of the two bus segments.

Buffer 80 also facilitates the transfer of memory signals between memory subunits 86 and 88 and primary memory controller 70. Buffer 80 electrically connects to memory subunit 86 through a secondary bus segment 82. Memory subunit 86 electrically connects to memory subunit 88 through an additional secondary bus segment 84. Buffer 80 transfers memory signals between bus segments 72 and 82. Memory subunit 86 receives and transmits memory signals for itself over secondary bus segment 82. In addition, memory subunit is capable of forwarding memory signals between secondary bus segments 82 and 84.

The primary and secondary memory buses can be configured in several different ways. Address and command memory signals can be carried over a separate bus in a conventional multi-drop configuration, leaving only data signaling to be carried over the depicted buses. Alternately, address and command memory signals can be carried on one or both of the primary and secondary memory buses. The timing diagrams of FIGS. 7 and 8 relate to an embodiment where address and command signals are carried on the primary and secondary memory bus segments.

Figure 6:
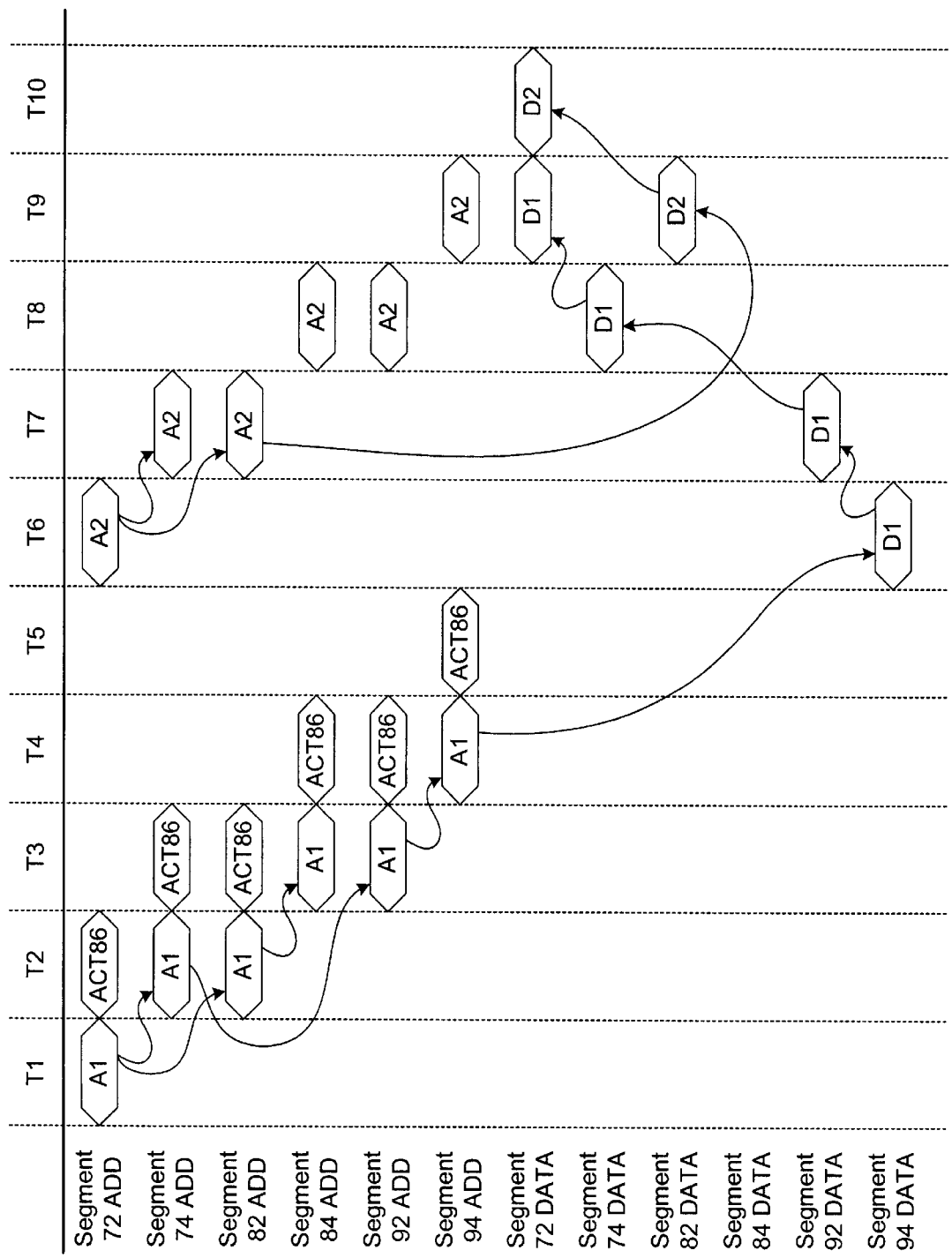
FIG. 6 shows one general board layout for a memory system embodiment that accepts up to four memory modules.

FIG. 6 illustrates a timing diagram for two read operations—a first read operation directed at an already-active memory subunit 98, an activating command for memory subunit 86, and a second read operation directed at memory subunit 86. The address and command signals for the first read operation are labeled A1, the subunit 86-activating address and command signals are labeled ACT86, and the address and command signals for the second read operation are labeled A2. The data signals returned by subunit 98 are labeled D1, and the data signals returned by subunit 86 are labeled D2.

The timing diagram of FIG. 6 is divided into 10 bus cycle times T1 to T10. The bus segments are each shown with two entries, an ADD entry representing the address and command signaling lines, and a DATA entry representing the data signaling lines. FIG. 6 assumes that each bus-driving unit has access to a common clock reference, thus allowing transfers on each segment to conform to the timing of the common clock reference. Although as illustrated address and data conform to a common timing and bus cycle time, this is not a necessary constraint. For instance, the data signaling rate may be a multiple of the address signaling rate.

Referring now to the actual memory operation timing depicted in FIG. 6, during bus cycle time T1 primary memory controller 70 places A1 on bus segment 72. Buffer 80 latches A1, and then redrives A1 onto segments 74 and 82 during bus cycle time T2. Also at T2, primary memory controller places the activating signaling ACT86 on bus segment 72. Thus at T2, buffer 80 latches ACT86, memory subunit 86 latches A1, and buffer 90 also latches A1. It can be appreciated that ACT86 will continue to follow the path taken by A1, but one bus cycle time removed.

At T3, memory subunit 86 and buffer 90 both redrive A1, respectively on bus segments 84 and 92. Thus at T3, memory subunits 88 and 96 latch A1. At T4, memory subunit 96 redrives A1 onto bus segment 94, and memory subunit 98 (the destination memory subunit) latches A1.

Two bus cycle times (for example) after latching A1, subunit 98 drives data D1 corresponding to address A1 onto bus segment 94. D1 follows the reverse of the path taken by A1 to reach memory subunit 98 in order to reach primary memory controller 70 during bus cycle time T9. Note that buffer 80 does not propagate D1 onto bus segment 82 because D1 is a downstream signal.

Meanwhile, the activating signal ACT86 reached its destined memory subunit 86 during bus cycle time T2, meaning that subunit 86 will subsequently be activated for following memory commands, including A2. Primary memory controller 70 waits, however, to issue A2 long enough so that D2 will not conflict with D1 on the bus. For the configuration of FIG. 5, FIG. 6 represents a worst-case wait scenario where a read to a memory unit furthest away from the controller, segment-wise, is followed by a read to a memory unit closest to the controller. Primary memory controller 70 can calculate the minimum wait time from the difference in segment distances to the addressed memory subunits. Alternately, memory controller 70 can wait the worst-case time each time it addresses a new memory subunit. For the configuration of FIG. 5, the necessary wait causes memory controller 70 to place A2 on bus segment 72 at T6.

Although in this example A2 propagates to all bus segments, it is latched by the destination memory subunit 86 during T7. Two bus cycles times later, at T9, memory subunit 86 drives D1 onto bus segment 82, where D1 is latched into buffer 80 and redriven to primary memory controller 70 during T10.

Several modifications can be made to the method of system operation shown in FIG. 6. One modification is to incorporate a capability that prevents signals from being redriven along segments that do not reach the intended memory subunit. A second modification is to drive signals along the bus segments using source-synchronous signaling, such that signals can be redriven without waiting for the next bus cycle time to arrive. These two modifications will be explored in turn.

In FIG. 6, A1, ACT86, and A2 propagate along bus paths to memory subunits that receive the signals unnecessarily. If desired, this result can be avoided by having the buffers 80, 90 and/or memory pass-through subunits 86, 96 respond to forwarding signals placed on bus segment 72 by controller 70. The forwarding signals can be part of the device address signaling, or can be passed by means of a group of enable signal lines. In operation, buffer 80 can sense the forwarding signals and take one of two actions: when the forwarding signals indicate that the memory signals are directed to memory subunit 86 or 88, it forwards the memory signals up bus segment 82; otherwise, it forwards the memory signals up bus segment 76. Likewise, memory subunit 86 can forward the memory signals to bus segment 84 only in the case where subunit 86 will not be consuming those signals itself The forwarding signals can be sent first, e.g., in the bus cycle time preceding the cycle during which they will apply, if time is needed to configure the forwarding capability of the devices.

In another modification, the address/command signals and/or the data signals can be propagated using source synchronous signaling. In this case, each bus driver is responsible for placing a strobe on a bus segment whenever it places memory signals on the segment. The receiving unit on that bus segment can respond to a received strobe by redriving the memory signals without latching and framing those signals to a bus cycle time.

Figure 7:
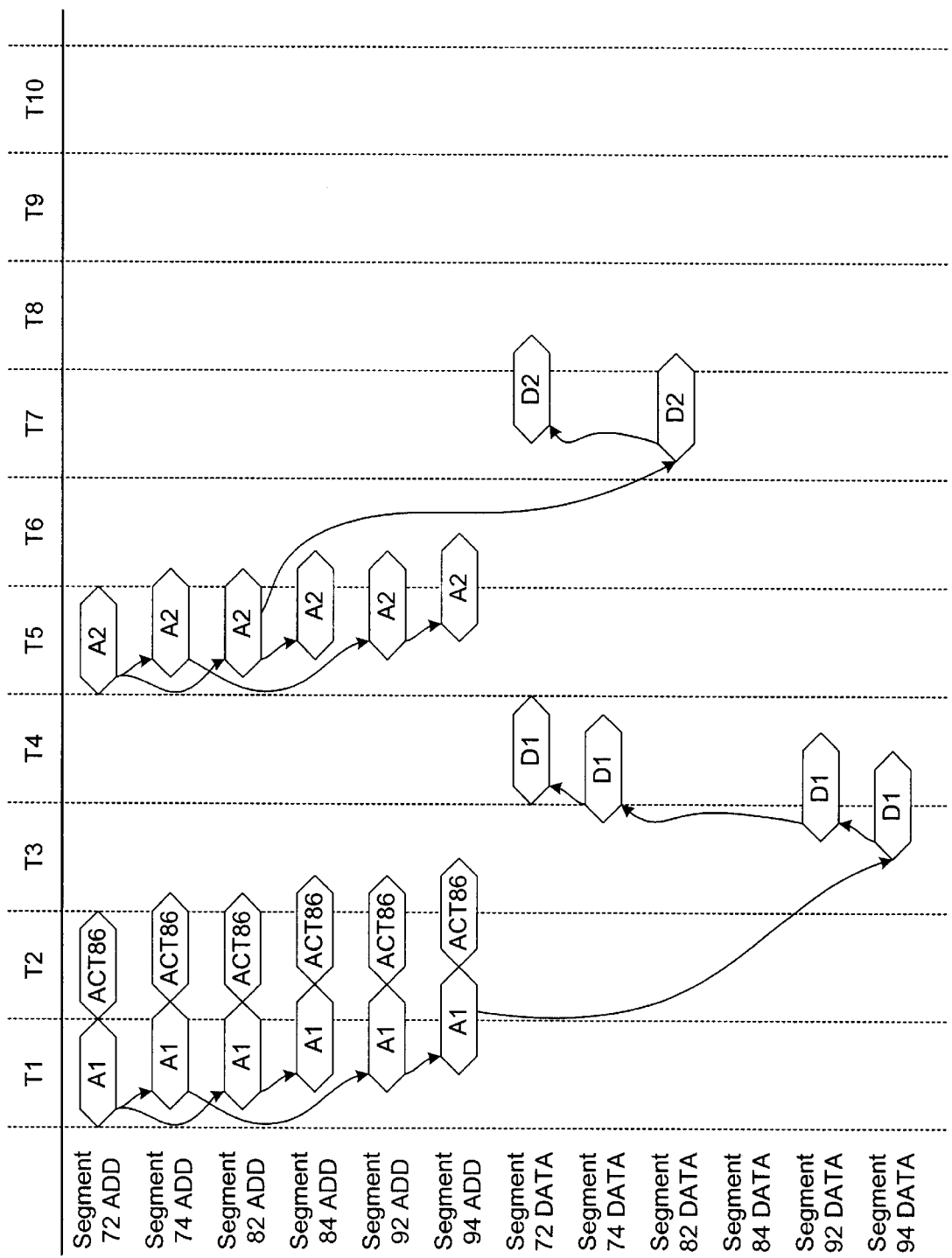
FIG. 7 shows an alternate board layout for a memory system embodiment that accepts up to four memory modules.

FIG. 7 shows timing for source-synchronous operation given the memory operations of FIG. 6. The signals potentially can propagate along multiple hops much faster than in the example of FIG. 6. Although the memory subunits receive signals that are not aligned with the bus cycle timing of the primary memory controller (shown), from each memory subunit's perspective, the signals are timed consistently. For instance, buffer 80 redrives A1 shortly after sensing the strobe from memory controller 70, and will redrive ACT86 approximately one bus cycle time later.

Returning to the common clocking example, the bus delays can be used to advantage to read two memory subunits simultaneously. For instance, subunits 88 and 98 can be addressed simultaneously using the same set of address signals (the memory element addressed on each subunit are logically different, however). Because the address signals reach subunit 88 one clock cycle before they reach subunit 98, subunit 88 will place return data on the bus first. The return data from subunits 88 and 98 will be separated on bus segment 72 by two bus cycle times. Other operational modes that take advantage of the bus segment delays can be similarly designed to utilize the pipelining properties of such a bus.

Figure 8:
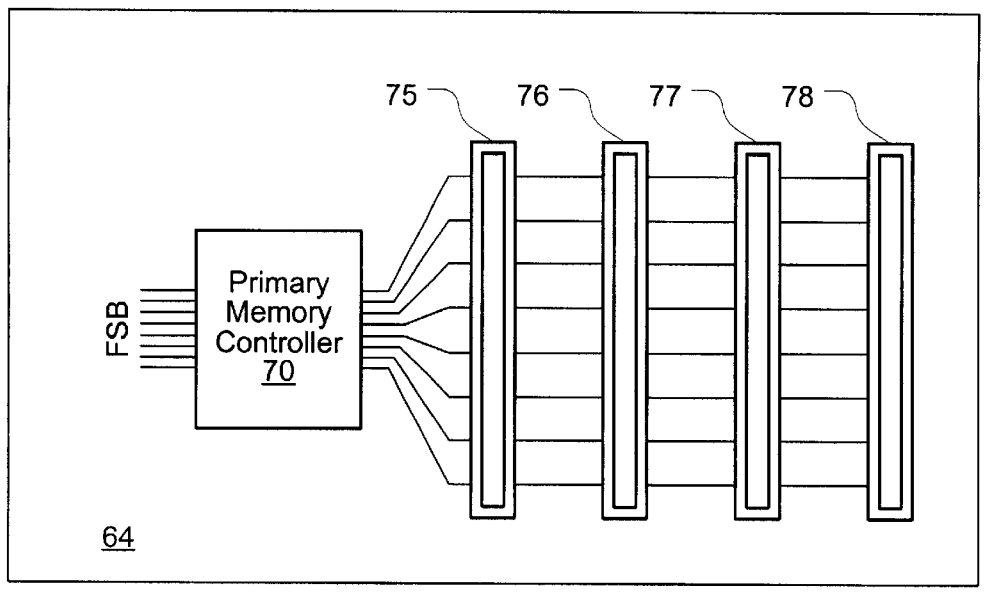
FIG. 8 contains a timing diagram for two memory operations, for an embodiment using common clocking.
Figure 9:
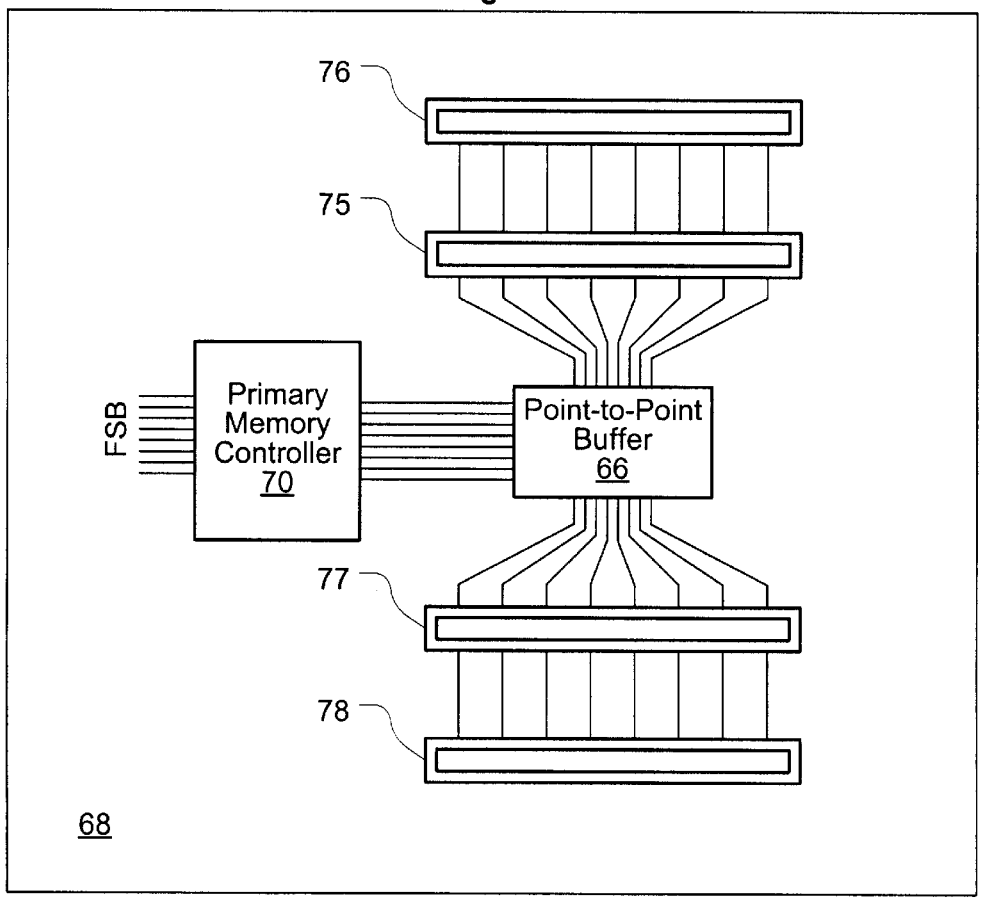
FIG. 9 contains a timing diagram for two memory operations, for an embodiment using source-synchronous clocking.
Figure 12:
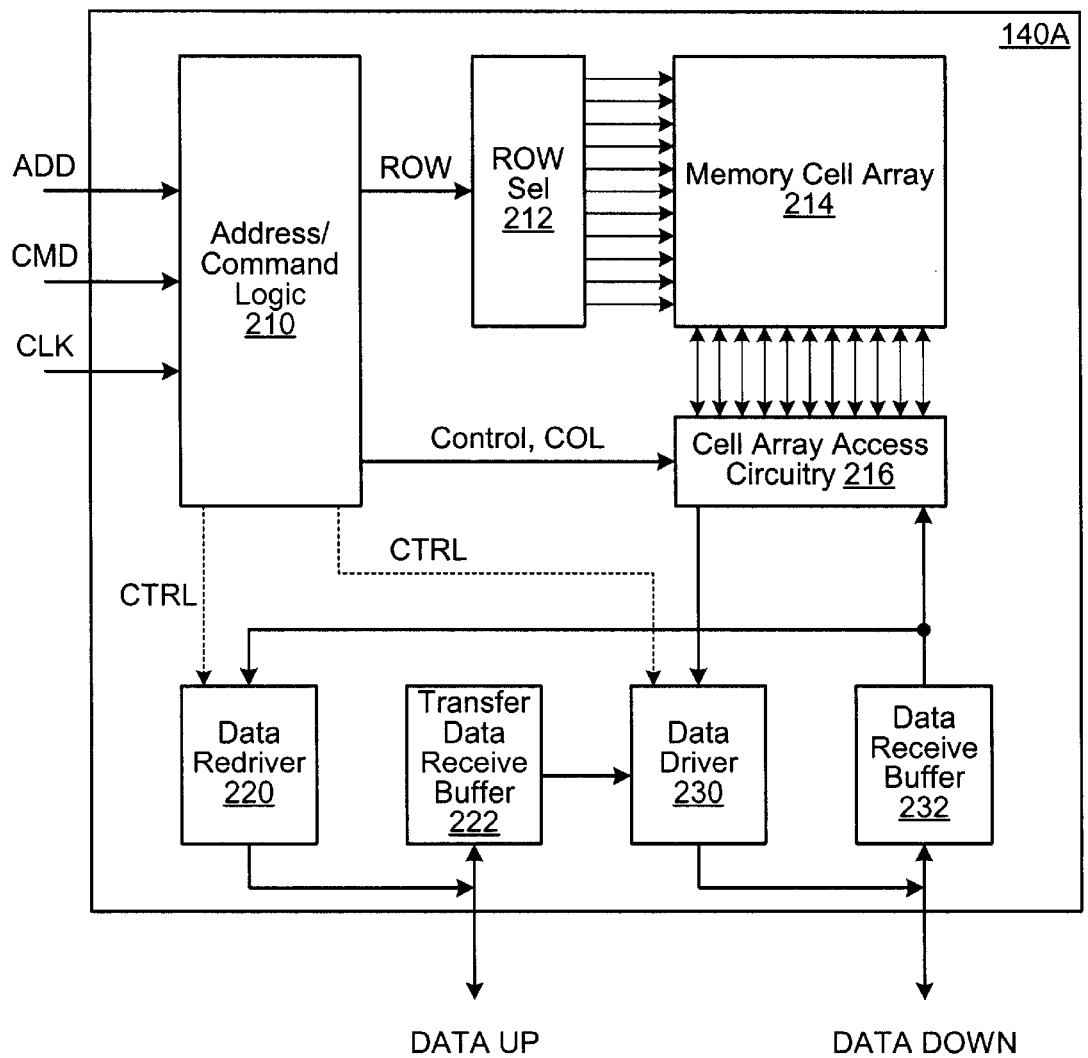
FIG. 12 contains a high-level block diagram for a memory device that includes buffer circuitry for attachment in a point-to-point arrangement of memory devices.

The remaining figures illustrate various configurations useful with the present invention. FIGS. 8 and 9 show memory board configurations. FIGS. 10A, 10B, and 11 show module configurations. And FIG. 12 shows a block diagram for a representative memory device configuration.

Referring first to FIG. 8, a portion of a motherboard 64 is illustrated. A primary memory controller 70 connects to a number of board traces that make up a frontside bus FSB. On the memory side of controller 70, a primary memory bus segment connects controller 70 to a module socket (e.g., a board edge connector) 75. Additional primary memory bus segments connect additional sockets 76, 77, and 78 to controller 70 in a daisy-chain fashion. Memory is added to motherboard 64 by placing memory modules in sockets 75, 76, 77, and 78—if only one module is used, it is placed in socket 75, two modules are placed in sockets 75 and 76, and so on. Preferably, all memory modules are identical, although the furthest upstream memory module in any set of modules need not be capable of driving signals on an upstream bus segment.

FIG. 9 shows another possible motherboard configuration 68. On motherboard 68, a first primary memory bus segment connects primary memory controller 70 to a point-to-point buffer 66 (i.e., a splitting node). Buffer 66 has two upstream memory bus segments, one connected to socket 75 and the other connected to socket 77. Socket 76 is connected by an additional memory bus segment to socket 75, and socket 78 is connected by another additional memory bus segment to socket 77. Memory modules can be added alternately to the two upstream bus segments of buffer 66, or one bus segment can be populated first. Motherboard 68 decreases by one the maximum number of hops required to reach four memory modules (more significant decreases may be observed for larger numbers of modules). Motherboard 68 also provides an additional level of fault tolerance, i.e., a fault in the buffer circuitry of a module inserted in socket 75 need not disable communications between the primary memory controller and all memory modules.

FIGS. 11A and 11B show, respectively, top-edge and side views of a memory module 100 according to an embodiment of the invention. Memory module 100 is useful, e.g., in the motherboard configurations of FIGS. 8 and 9. A bank of eight memory devices, labeled 140A to 140H, populates the upper portion of one side of module 100. A second corresponding bank (beginning with device 142A) populates the other side of module 100. The first side contains three other devices: ADD/CMD (Address/Command) Redrive/Transfer Logic 110; L (Left) Data Redrive/Transfer 120; and R (Right) Data Redrive/Transfer 130. Together, these three devices function as buffer circuitry capable of functioning as a splitting node. The controller functions performed by these devices are partitioned into three circuits for routing and pinout convenience—a lesser or greater number of devices can be designed to perform the same function. Left and right redrive/transfer devices 120 and 130 perform the same functions at the same time, just on different groups of data lines.

Also shown in FIGS. 13A and 13B are address/command and data lines. The external address and command lines are shown as two single lines, one connecting logic 110 to a downstream address/command bus port ADD DOWN, the other connecting logic 110 to an upstream address/command bus port ADD UP (a dashed line exiting module 100 in FIG. 10B represents a signal routed on the opposite side of the module—this is not necessary, but is one preferred method of routing). Each single-address-line depiction in FIG. 13B will typically represent multiple address and command signal lines, the number depending on device type, addressable memory size, etc. Four sets of four external data bus lines each are also shown, the sets connected respectively to L data redrive/transfer 120 ports L UP and L DOWN, and R data redrive/transfer 130 ports R UP and R DOWN. Together, L DOWN and R DOWN form an eight-bit-wide downstream data bus, and L UP and R UP form an eight-bit-wide upstream data bus. This bus width is exemplary, as any other bus width can also be selected.

Externally, memory module 100 can connect to two primary memory bus segments through its upstream and downstream ports. Each redrive/transfer circuit is capable of receiving a memory signal at its DOWN port and redriving that signal out its UP port. Likewise, a memory signal received at each circuit's UP port can be redriven out the DOWN port. Each redrive/transfer circuit is capable of transferring a memory signal received at its DOWN port to an internal bus port. Data redrive/transfer circuits can also transfer memory signals from their internal bus port to their DOWN port.

The internal bus ports of circuits 120 and 130 are utilized as follows. A set of data traces connects the module memory bus port of circuit 120 to memory devices 140A–140D; a separate set of data traces connects the module memory bus port of circuit 130 to memory devices 140E–140H. Together, these data traces form a first module memory bus segment. The dashed lines (FIG. 10A) passing between matching memory devices on opposite sides of module 100 form a second module memory bus segment. Together, these first and second module memory bus segments form a linear (in the sense that devices related to any particular data line are daisy-chained) point-to-point bus configuration where circuits 120 and 130 lie at one end of a module memory bus, memory bank 142A–142H lies at the other end of the module memory bus, and memory bank 140A–140H lies between the two. In addition to transmitting and receiving memory signals for themselves with buffer circuits 120 and 130, each of memory devices 140A to 140H is capable of forwarding memory signals along the memory bus, i.e., between circuits 120, 130 and memory bank 142A–142H. In a configuration with more than two banks of memory, each bank intermediate the bus ends would have a similar forwarding capability.

In FIG. 10B, address and command signals from ADD/CMD redrive/transfer circuit 110 are connected to a multi-drop module address bus segment that supplies the address signal to each of memory devices 140A–140H. The memory devices on the two sides of the module can connect with additional address bus segments. Optionally, redrive/transfer circuit 110 can connect to both banks of memory devices directly.

In FIG. 10B, latching and redriving operations at buffer circuits 120 and 130 are sequenced by a CLK signal from address/command redrive/transfer circuit 110. Other clocking possibilities include driving clock signals on the bus to each buffer circuit in addition to transfer circuit 110, providing a separate phase-locked loop on the module, or even clocking transfer circuit 110 from one of the buffer circuits. FIG. 11 shows one other alternative based on source-synchronous data transfer principles.

Memory module 150 of FIG. 11 bases the timing of data signaling (DQ) on data strobes (DQS). Each external bus port contains a data strobe line, e.g., R UP has an additional signal line DQSRU used for a data strobe. When a device upstream of module 150 places data on the bus segment connected to R UP, it strobes DQSRU. When right data redrive/transfer circuit 180 senses the incoming strobe on DQSRU, circuit 180 configures itself to replicate data from R UP and redrive that data on R DOWN. Circuit 180 will, as part of the redrive operation, strobe DQSRD for the benefit of a downstream device.

Upstream operation is handled similarly to downstream operation. When data is transmitted upstream, however, it is also transferred to the module memory bus and driven to the first bank of memory devices. The on-module data transfers can also be handled using a DQS signal. On module 150, each memory device has a DQ port for data signals and a corresponding DQS port for an associated data strobe. When redrive/transfer circuit 180 receives upstream data at R DOWN, that data is redriven on R UP, and is also driven to memory devices 140E–140H. Each connection between circuit 180 and a memory device uses a DQS line, such that circuit 180 strobes the DQS lines to signal the memory devices that data is present on the DQ lines. When the memory devices pass data downstream to circuit 180, each device strobes its DQS line in similar fashion.

DQ and DQS connections between memory bank 140A–140H and memory bank 142A–142H operate like those between circuits 170, 180 and memory bank 140A–140H.

It is noted that the redrive/transfer circuits of FIGS. 10A/B and 11 can have other functions besides data redrive/transfer. The circuits can also provide clock synchronization between their external ports and/or between the external and module buses. Preferably, the circuits will provide capacitive isolation between the external and module buses. Where the memory devices require different signaling voltages than those used by the motherboard circuitry, the transfer circuits can also provide voltage translation.

FIG. 12 shows the block diagram for a memory pass-through device 140A according to an embodiment of the invention. In some respects, memory device 140A operates like a conventional memory device. For instance, address signals ADD, command signals CMD, and clock signaling CLK are received by address/command logic 210. These eternally-supplied signals comprise memory commands that cause the address/command logic 210 to control operation of device 140A according to a predefined operation. This generally includes activating a row of memory cell array 214 by passing a ROW signal to row selector 212, and then sending a COL signal (indicating the desired column in memory cell array 214) and control signals to cell array access circuitry 216.

In addition to these common functions, memory device 140A comprises two data ports, DATA UP and DATA DOWN. Data driver 230 connects between cell array access circuitry 216 and the DATA DOWN port. When data is read from a desired location in cell array 214 by access circuitry 216, data driver 230 receives that data from access circuitry 216 and drives it out on the DATA DOWN port.

Data receive buffer 232 also connects to the DATA DOWN port. When data is received at the DATA DOWN port, data receive buffer captures that data and makes it available to cell array access circuitry 216. When cell array access circuitry 216 is to perform a write to memory cell array 214, it will accept the data from data receive buffer 232.

The DATA DOWN port of memory device 140A has additional functions not needed for an on-chip memory operation. These functions utilize two additional functional blocks, a data redriver 220 and a transfer data receive buffer 222, and an additional data port, DATA UP. When data is received at data receive buffer 232, that data is made available to data redriver 220 in addition to being made available to cell array access circuitry 216. Data redriver 220 redrives that data out on the DATA UP port. When data is received at the DATA UP port, transfer data receive buffer captures that data and makes it available to data driver 230. Data driver 230 then redrives that data out on the DATA DOWN port. These functions allow memory device 140A to be daisy-chained in a point-to-point memory bus with other memory devices.

FIG. 12 depicts some optional control lines CTRL. Without these lines, redriver 220 drives all data received at buffer 232, and data driver 230 chooses which of its two inputs (if either) should be driven. The control lines CTRL allow each (or one) of these operations to be placed under the control of the address/command logic 210. For instance, when address/command logic 210 has configured cell array access circuitry 216 to accept data from data receive buffer 232, it can at the same time instruct data redriver 220 not to pass that data out the DATA UP port since the data is being consumed on-chip. And address/command logic 210 can leave data driver 230 configured to accept data from transfer data receive buffer 222 except when cell array access circuitry 216 has been configured to pass data to data driver 230.

Although only one line is shown at each of the DATA DOWN and DATA UP ports, this represents all data lines for memory device 140A. For instance, device 140A may have a word width of eight bits, in which case each buffer and driver would be eight bits wide. Where the device operates in a source-synchronous manner, DQS lines would also be included on the DATA DOWN and DATA UP ports. Or, if the device can accept data masking, a unidirectional data mask bit can be received by buffer 232 and driven by redriver 220.

The types, sizes, or numbers of memory devices selected for use with the present invention are not critical. Some possible device types include dynamic random access memory (DRAM) devices, synchronous DRAM (SDRAM) devices including double-data-rate (DDR) SDRAM devices, quad-data-rate (QDR) SDRAM devices, Rambus™ DRAM devices (with an appropriate controller), static RAM and flash memory devices. It may be possible to combine memory modules in a memory system according to the invention where two modules incorporate different types of memory devices. Although the memory pass-through circuitry has been described as integrated with a memory device, the pass-through circuitry may be placed on a separate interface circuit.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A memory system comprising:
   a primary memory bus;
   a memory controller capable of receiving and transmitting memory signals on the primary memory bus; and
   a first memory unit capable of receiving and transmitting memory signals on the primary memory bus, the memory unit having buffer circuitry, a secondary memory bus comprising multiple point-to-point memory bus segments, and multiple memory subunits, one of the memory subunits electrically connected to the buffer circuitry via one of the secondary point-to-point memory bus segments, each additional memory subunit electrically connected to a corresponding preceding one of the memory subunits via an additional one of the secondary point-to-point memory bus segments, the buffer circuitry capable of transferring memory signals between the primary and secondary memory buses.

2. The memory system of claim 1, further comprising a second memory unit, wherein the primary memory bus comprises:
   a first primary bus segment to transfer memory signals between the first memory unit and the memory controller; and
   a second primary bus segment to transfer memory signals between the first and second memory units, the first memory unit forwarding memory signals received on one of the primary bus segments to the other of the primary bus segments.

3. The memory system of claim 2, wherein the second memory unit is similar to the first memory unit.

4. The memory system of claim 2, wherein each memory unit is a memory module, and wherein each of the memory subunits comprises a bank of memory devices mounted on the module.

5. The memory system of claim 2, wherein the second primary bus segment comprises a set of memory lines arranged on a circuit board between two board edge connectors, each connector capable of accepting a memory module.

6. The memory system of claim 2, wherein the memory signals transmitted on the primary and secondary memory buses comprise data signals.

7. The memory system of claim 6, wherein the memory signals-transmitted on the primary memory bus further comprise address signals.

8. The memory system of claim 6, wherein the memory signals transmitted on the secondary memory bus further comprise address signals.

9. The memory system of claim 2, further comprising a common clock reference connected to each memory unit such that each primary memory bus data transfer between the two memory units or between the first memory unit and the memory controller is timed according to the common clock reference.

10. The memory system of claim 2, wherein each primary memory bus segment comprises a data strobe line, each memory unit and the memory controller indicating a data transfer placed on a primary memory bus segment by that unit or controller by placing a corresponding signal on the data strobe line associated with that memory bus segment.

11. The memory system of claim 10, wherein the buffer circuitry of the first memory unit forwards memory signals from one primary bus segment to the other primary memory bus segment in less than one bus cycle time.

12. A memory module comprising:
    at least two banks of memory devices;
    buffer circuitry to receive and transmit memory signals over a primary memory bus when the module is physically connected in a memory system, the buffer circuitry having at least one primary memory bus port and a module memory bus port; and
    a module memory bus segment for each bank of memory devices, the memory bus segments connecting the buffer circuitry module memory bus port to the banks of memory devices in a linear point-to-point bus configuration wherein the buffer circuitry lies at one end of the configuration and one of the banks of memory devices lies at the other end, each memory bank intermediate the ends of the configuration forwarding memory signals along the bus.

13. The memory module of claim 12, wherein in the buffer circuitry the at least one primary memory bus port comprises an upstream primary memory bus port and a downstream primary memory bus port, the buffer circuitry forwarding memory signals between the primary memory bus ports, the buffer circuitry also forwarding memory signals between the downstream primary memory bus port and the module memory bus port.

14. The memory module of claim 12, wherein the module memory bus comprises data signaling lines, the memory module further comprising a single-segment address/command bus connecting the buffer circuitry to each of the banks of memory devices.

15. The memory module of claim 12, wherein the memory unit buffer circuitry comprises an address/command buffer and two data buffers, each data buffer connected to approximately half of a bank of memory devices.

16. The memory module of claim 15, wherein the address/command buffer supplies a clocking signal to the data buffers.

17. A memory device comprising:
    a memory cell array with associated access circuitry;
    a downstream data port and an upstream data port;
    a data receive buffer to receive data at the downstream data port and forward data to the access circuitry;
    a transfer data receive buffer to receive data at the upstream data port;
    a data driver to receive data from the access circuitry and from the transfer data receive buffer, and to drive data on the downstream data port; and
    a data redriver to redrive data received at the downstream data port on the upstream data port.

18. The memory device of claim 17, further comprising address/command logic to control operation of the memory device according to externally-supplied memory commands, the address/command logic controlling operation of the data driver, the data redriver, and the transfer data receive buffer.

19. A method of host/memory communication comprising:
    receiving and transmitting memory signals at a memory controller node having an upstream port;
    at at least one splitting node having a downstream port and at least two upstream ports, when a memory signal is received at the downstream port, retransmitting that signal at at least one of the upstream ports, and when a memory signal is received at one of the upstream ports, retransmitting that signal at the downstream port; and
    at at least one memory pass-through node having an upstream port and a downstream port, when a memory signal is received at an upstream port, retransmitting that signal at the downstream port, and when a memory signal originates at the memory pass-through node, transmitting that signal at the downstream port.

20. The method of claim 19, further comprising, at at least one memory terminal node having a downstream port, receiving and transmitting memory signals at the downstream port.

21. The method of claim 19, further comprising when a memory signal is received at the downstream port of a splitting node, determining which of the upstream ports leads towards the destination node of the memory signal, and retransmitting the memory signal only on that upstream port.

22. The method of claim 19, wherein when a memory signal is received at the downstream port of a splitting node, retransmitting the memory signal comprises retransmitting the memory signal on all upstream ports of that node.

23. The method of claim 19, further comprising when a memory signal is received at the downstream port of a memory pass-through node, retransmitting that signal at the upstream port of that node.

24. The method of claim 19, further comprising when a memory signal is received at the downstream port of a memory pass-through node, retransmitting that signal at the upstream port of that node when the memory signal is not destined for that node.

* * * * *